US006636345B2

(12) United States Patent
Hempstead

(10) Patent No.: US 6,636,345 B2
(45) Date of Patent: Oct. 21, 2003

(54) OPTICAL FIBER PUMPING SYSTEM

(75) Inventor: Martin Hempstead, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/793,117

(22) Filed: Feb. 27, 2001

(65) Prior Publication Data

US 2002/0118447 A1 Aug. 29, 2002

(51) Int. Cl.[7] .............................. H01S 3/09; H01S 3/091
(52) U.S. Cl. ............... 359/341.32; 359/341.1; 359/341.33; 359/341.41
(58) Field of Search ................ 359/341.32, 31

(56) References Cited

U.S. PATENT DOCUMENTS

| | | | | |
|---|---|---|---|---|
| 4,963,832 A | * | 10/1990 | Desurvire et al. ..... | 359/341.41 |
| 5,039,199 A | * | 8/1991 | Mollenauer et al. ........ | 359/334 |
| 5,173,957 A | * | 12/1992 | Bergano et al. ................ | 372/30 |
| 5,241,414 A | * | 8/1993 | Giles et al. .................. | 257/529 |
| 5,245,690 A | * | 9/1993 | Aida et al. ............. | 359/337.11 |
| 5,321,707 A | * | 6/1994 | Huber ............................ | 372/6 |
| 5,323,474 A | * | 6/1994 | Hornung et al. ................ | 372/6 |
| 5,406,411 A | | 4/1995 | Button et al. | |
| 5,461,497 A | * | 10/1995 | Mackichan .................. | 359/177 |
| 5,510,930 A | | 4/1996 | Motoshima et al. ........ | 359/160 |
| 5,710,660 A | * | 1/1998 | Yamamoto et al. .......... | 359/179 |
| 5,721,636 A | * | 2/1998 | Erdogan et al. ....... | 359/341.33 |
| 5,761,234 A | | 6/1998 | Craig et al. | |
| 5,859,938 A | * | 1/1999 | Nabeyama et al. ............. | 372/6 |
| 5,966,206 A | * | 10/1999 | Jander ........................ | 356/73.1 |
| 5,991,069 A | | 11/1999 | Jander | |
| 6,008,934 A | | 12/1999 | Fatehi et al. | |
| 6,028,698 A | | 2/2000 | Ogoshi et al. | |
| 6,122,298 A | * | 9/2000 | Kerfoot et al. ................. | 372/6 |
| 6,132,104 A | * | 10/2000 | Bliss et al. .................. | 385/135 |
| 6,266,466 B1 | * | 7/2001 | Nabeyama et al. ............. | 372/6 |
| 6,282,002 B1 | * | 8/2001 | Grubb et al. ................ | 359/134 |
| 6,320,694 B1 | * | 11/2001 | Ohshima ............... | 359/341.33 |
| 6,344,922 B1 | * | 2/2002 | Grubb et al. ................ | 359/134 |

OTHER PUBLICATIONS

WO 98/52305 Nov. 1998 Munks et al.*

* cited by examiner

Primary Examiner—Thomas H. Tarcza
Assistant Examiner—Stephen Cunningham
(74) Attorney, Agent, or Firm—Svetlana Z. Short; Thomas W. Cole

(57) ABSTRACT

The optical fiber pumping system includes a connector that is adapted to selectively communicate with an external pump system. The connector communicates with an onboard pump multiplexer which also receives input from an on-board pump via a connector. The on-board pump may be hot swapped by connecting an external pump system to the connector and coordinating the power up of the external pump system with the power down of the on-board pump to replace a failed on-board pump with a new pump.

9 Claims, 1 Drawing Sheet

OPTICAL FIBER PUMPING SYSTEM

BACKGROUND OF THE INVENTION

1. Field of the Invention

This invention is related to the field of optical fiber pumping systems. More particularly, the invention is directed to a system and apparatus that enables swapping of optical amplifier pumps from an onboard optical fiber system while the optical fiber system is operating.

2. Description of the Related Art

Typical optical fiber pumping systems include a "soft-fail" design that uses redundant pumps to prevent downtime when one of the pumps fails. For example, a optical fiber pumping system which includes at least two pump lasers that feed their power into a conventional coupler that combines the outputs of each pump laser into a single output. In this manner, the failure of one of the pump lasers results in a corresponding percentage decrease in the amplification ability of the optical fiber pumping system. For example, if the optical fiber pumping system includes two pump lasers, failure of one of the pump lasers will typically result in an output of only fifty percent of the designed output. These systems often include monitors that indicate when a pump has failed, thus, when a pump has failed, an operator may take the entire optical pumping system off-line and replace the failed pump laser with a new pump laser.

Other conventional optical fiber pumping systems provide protective switching that re-route the signal to other parallel optical fiber pumping systems around the failed optical fiber pumping system. Such systems completely remove the load from the optical fiber pumping system and enable a technician to remove and service the entire optical fiber pumping system. Such systems require redundant optical fiber pumping systems which adds a great deal of expense.

SUMMARY OF THE INVENTION

The invention is an optical fiber pumping system that enables a hot swap of a failed pump. The optical fiber pumping system includes an external connector that enables an external pump laser to be connected to the optical fiber pumping system. The external connector communicates with a pump multiplexer that also receives an input from the on-board pump laser. The pumping system may also include an onboard connector that is positioned between the on-board pump laser and the pump multiplexer to break the connection between a failed on-board pump laser and the pump multiplexer.

The optical fiber pumping system of the present invention may also include a gain control system that coordinates the shut down of the on-board pump laser with the power up of an external pump laser system.

The external pump laser system may include a plurality of pump lasers whose combined or averaged output wavelength approximates the wavelength of the on-board pump laser.

The external pump laser system may include inexpensive but high power sources since the reliability of the external power source does not need to be high.

Additionally, any number of on-board pumps may be replaced using the external pumping system.

DETAILED DESCRIPTION OF THE INVENTION

Figure 1:
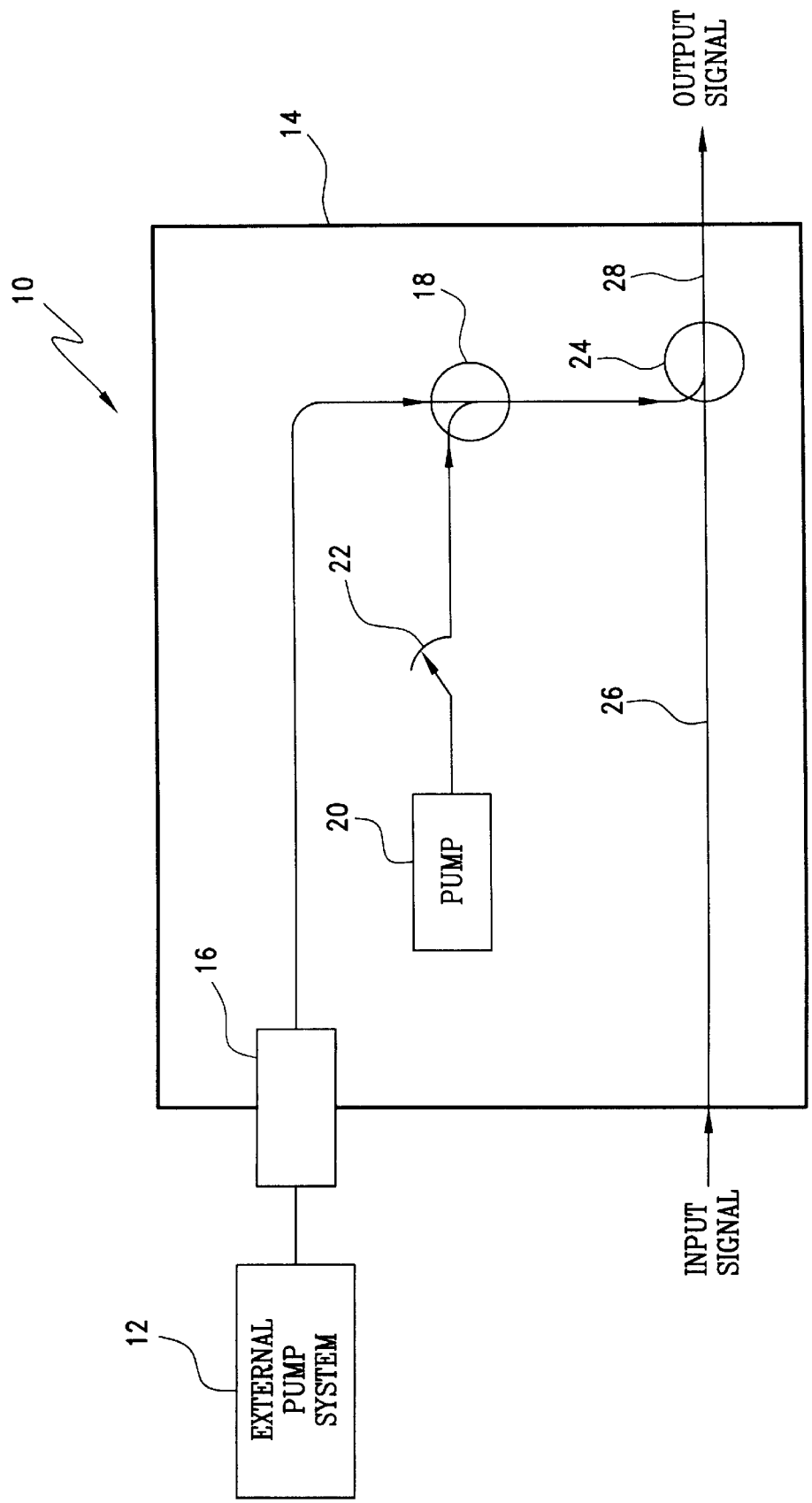
FIG. 1 is a schematic diagram of one embodiment of an optical fiber pumping system in accordance with the present invention.

FIG. 1 shows a schematic diagram of an optical fiber pumping system 10 in accordance with the present invention. The optical fiber pumping system includes an external pump 12 and an on-board optical pumping system 14. The on-board optical pumping system 14 includes a connector 16 that is adapted to communicate with the external pump system 12. The connector 16 is in communication with a pump/signal multiplexer 18. The connector 16 may be a bulkhead optical connector, a bare pig-tail, a connectorized pig-tail or the like. The on-board optical pumping system 14 also includes a pump 20 in communication with a connector 22. The pump/signal multiplexer 18 is in communication with another pump/signal multiplexer 24 that communicates with a signal line 26. The signal line 26 receives an input signal and communicates with pump/signal multiplexer 24 in communication with output signal line 28.

One of ordinary skill in the art understands that the on-board optical fiber pumping system 14 may also include many other conventional components that condition the input signal to provide the output signal which are not shown for the purpose of clarity. For example, the on-board optical fiber pumping system may include any number of additional input signal lines, additional pumps 20, pump/signal multiplexers, isolators, band pass filters, other conventional optical fiber system components or the like.

The optical fiber pumping system 10 may operate by a failure of pump 20 on the on-board optical pumping system 14 being detected. Pump failures may include a minor degradation in the pump that may be determined by a performance monitoring apparatus (not shown) in communication with the pump 20. Additionally, inferences may be drawn regarding the pump degradation by monitoring the electrical current required by the pump 20 to maintain a given level of pump 20 output. Additionally, a degradation of the pump may be inferred by increased cooling requirements of the on-board pumping system 14. A failing pump 20 may require additional cooling to maintain a given level of output.

Once it is determined that the pump has failed in some manner, a technician may connect an external pump system 12 to the connector 16. The external pump system may then be powered up and the pump 20 may be powered down in a coordinated manner so that the pump/signal multiplexer 24 does not receive a widely varying input. After the pump 20 is powered down, the connector 22 may be disconnected and the failed pump 20 may be removed from the on-board optical fiber pumping system 14. A new optical pump 20 may then be installed into the optical fiber pumping system 14. The switch 22 may then be closed and the new pump 20 may be powered up in a coordinated manner with the power down of the external pump system 12 to avoid widely varying inputs to the pump multiplexer 24.

The power up of the external pump system 12 and the power down of the on-board pump 20 may be controlled by an automatic gain control system (not shown). An automatic gain control system may be necessary depending upon the automatic gain control alarms and monitors that are available to set the external pump. However, it is also desirable to provide an automatic gain control system to permit continuous operation of the onboard gain control. The automatic gain control system may include multiple independent gain control systems that are coordinated and/or a single gain control system that is adapted to control both the onboard pump and the external pump. It is also conceivable that an optical fiber pumping system may include spare onboard pump that is controlled to compensate for a failed onboard pump until that failed pump is replaced.

If the multiplexer 18 operates on a specific wavelength and the external pump system 12 operates on a different wavelength, then spectral changes in the output of the multiplexer 18 may occur due to pump wiggle. If such spectral changes are unacceptable, the external pump system may include a plurality of multiplexed pumps with an average wavelength that is equal to the on-board pump 20. It is to be understood that the present invention may be used with any type of multiplexer such as a polarizing multiplexer a wavelength multiplexer or the like.

One of ordinary skill in the art understands that the on-board pumping system 14 may contain many more multiplexers than are shown in FIG. 1. Additionally, to accommodate the external pump system 12 additional multiplexers 18 may be added upstream or downstream of the existing on-board multiplexers. Alternatively, additional external connectors 16 may be provided to the on-board optical pumping system 14. In any case, many modifications may be made to the embodiment shown in FIG. 1 to ensure the correct distribution of pump power through the amplifier in all circumstances. One of ordinary skill in the art also understands that any number of amplifiers on the on-board optical fiber pumping system 14 may be connected through a 1xn switch (not shown) to a single external pump system that may be automatically routed to any amplifier with a failing pump.

While various embodiments in accordance with the present invention have been shown and described, it is understood that the invention is not limited thereto, and is susceptible to numerous changes and modifications as known to those skilled in the art. Therefore, this invention is not limited to the details shown and described herein, and includes all such changes and modifications.

What is claimed is:

1. An optical fiber pumping system, said system comprising:
    a first internal optical pump;
    a first pump/signal multiplexer in communication with said first optical pump;
    a second pump/signal multiplexer in communication with said first pump/signal multiplexer and a signal line;
    an external connector in communication with said first pump/signal multiplexer, and
    an external pump system optically and mechanically independent from said first internal optical pump and detachably connectable to said external connector for facilitating replacement of said first pump with a third optical pump.

2. The system of claim 1, further comprising a switch through which said first optical pump may selectively communicate with said first pump multiplexer.

3. The system of claim 1, further comprising a gain control system in communication with said first pump and said external pump system that coordinates a shut down of said first pump with a powering up of said external pump system.

4. The system of claim 1, wherein said external pump system includes a second optical pump.

5. The system of claim 1, wherein said first internal optical pump, said first and second pump/signal multiplexers, and said external connector are components all on the same board, and said external pump system is mechanically and optically independent of said components on said board.

6. The system of claim 3 and a second gain controller in communication with said second optical pump and said first gain controller.

7. An external pump system adapted to communicate with an optical fiber pumping system that includes a first internal optical pump, a pump/signal multiplexer in communication with said first optical pump, and an external connector in communication with said pump/signal multiplexer, said external pump system comprising:
    a second optical pump;
    a connector in communication with said second optical pump, wherein said connector is adapted to detachably connect to said external connector on said optical fiber pumping system, and
    a gain control system in communication with said first and second optical pumps that coordinates a shut down of said first pump with a powering up of said second pump.

8. A method for replacing an optical pump in an optical fiber pumping system that includes a first optical pump, a pump/signal multiplexer in communication with said first optical pump, and an external connector in communication with said first pump/signal multiplexer, said method comprising the steps of:
    providing an external pump system that includes a second optical pump;
    detachably connecting said external pump system to said external connector;
    powering-up said second optical pump;
    removing the power from said first optical pump while said second optical pump is powered up such that a selected gain level is maintained;
    removing said first optical pump from said optical fiber pumping system;
    providing a third optical pump;
    installing said third optical pump in said optical fiber pumping system;
    powering-up said third optical pump;
    removing the power from said second optical pump while said third optical pump is powered up such that a selected gain level is maintained; and
    disconnecting said external pump system from said external connector.

9. The method of claim 8, further comprising the steps of switching said first optical pump out of communication with said pump/signal multiplexer before removing said first optical pump and switching said third optical pump into communication with said pump/signal multiplexer before powering said third optical pump.

* * * * *